US010078859B2

(12) United States Patent
Sable

(10) Patent No.: US 10,078,859 B2
(45) Date of Patent: Sep. 18, 2018

(54) SYSTEM AND METHOD FOR CONSUMER SCREENING, SELECTING, RECOMMENDING, AND/OR SELLING PERSONAL SOUND AMPLIFICATION PRODUCTS (PSAP)

(71) Applicant: Sara J. Sable, Powell, OH (US)

(72) Inventor: Sara J. Sable, Powell, OH (US)

(*) Notice: Subject to any disclaimer, the term of this patent is extended or adjusted under 35 U.S.C. 154(b) by 511 days.

(21) Appl. No.: 14/805,749

(22) Filed: Jul. 22, 2015

(65) Prior Publication Data

US 2017/0024795 A1    Jan. 26, 2017

(51) Int. Cl.
*G06Q 30/00* (2012.01)
*G06Q 30/06* (2012.01)
*H04R 25/00* (2006.01)

(52) U.S. Cl.
CPC ..... *G06Q 30/0631* (2013.01); *G06Q 30/0617* (2013.01); *H04R 25/70* (2013.01)

(58) Field of Classification Search
CPC ...................................................... G06Q 30/00
See application file for complete search history.

(56) References Cited

U.S. PATENT DOCUMENTS

| | | | | |
|---|---|---|---|---|
| 6,322,521 B1 * | 11/2001 | Hou | ............ | A61B 5/121 381/23.1 |
| 6,522,988 B1 * | 2/2003 | Hou | ............ | A61B 5/121 702/108 |
| 9,326,706 B2 * | 5/2016 | Shennib | ............ | A61B 5/123 |
| 9,439,008 B2 * | 9/2016 | Shennib | ............ | H04R 25/70 |
| 2002/0054689 A1 * | 5/2002 | Zhang | ............ | H04R 25/70 381/312 |
| 2008/0187145 A1 * | 8/2008 | Burrows | ............ | A61B 5/0002 381/60 |

(Continued)

OTHER PUBLICATIONS

UHear1, "uHear—Test Your Hearing on a iPhone—App Review on Monday", appsreviewed.blogspot.com, Apr. 1, 2013. (Year: 2013).*

(Continued)

*Primary Examiner* — Mark A Fadok
(74) *Attorney, Agent, or Firm* — Porter, Wright, Morris & Arthur LLP

(57) ABSTRACT

A system selects a recommended PSAP from several different available PSAP by screening a consumer by providing a plurality of questions regarding the consumer's hearing that each require a subjective response and receiving the subjective responses from the consumer. The questions can include questions relating to hearing difficulty during one-on-one conversations, hearing difficulty during conversations with women and/or children, hearing difficulty during conversations in restaurants and/or meetings, and presence of stress and/or agitating sounds. The recommended PSAP is automatically selected for the consumer based at least in part on the subjective responses. The recommended PSAP provides enhancement of high frequencies if the responses indicate difficulty hearing women and/or children, provides reduction of low frequencies if the responses indicate difficulty hearing in restaurants and/or meetings, and provides phase cancellation if the responses indicate presence of stress and/or agitating sounds. The recommended PSAP is presented to the user for possible purchase.

20 Claims, 8 Drawing Sheets

(56) References Cited

U.S. PATENT DOCUMENTS

| | | | | |
|---|---|---|---|---|
| 2010/0226502 A1* | 9/2010 | De Finis | ............ | G06Q 30/0601 381/60 |
| 2013/0251165 A1* | 9/2013 | Jorgensen | ............... | H04R 25/30 381/59 |
| 2013/0339025 A1* | 12/2013 | Suhami | ................... | H04R 25/00 704/271 |
| 2013/0343583 A1* | 12/2013 | Marcoux | ................ | H04R 25/70 381/314 |
| 2014/0194774 A1* | 7/2014 | Gilligan | ................. | A61B 5/123 600/559 |
| 2014/0309549 A1* | 10/2014 | Selig | .................... | H04R 1/1041 600/559 |
| 2015/0025413 A1* | 1/2015 | Shennib | ................ | A61B 5/123 600/559 |
| 2015/0215714 A1* | 7/2015 | Shennib | ................ | H04R 25/70 381/60 |
| 2015/0358745 A1* | 12/2015 | Rix | ...................... | H04R 25/305 381/60 |
| 2016/0038062 A1* | 2/2016 | Morita | ................... | G06Q 30/06 600/559 |
| 2016/0045142 A1* | 2/2016 | Morita | ................... | G06F 19/345 600/559 |
| 2016/0135719 A1* | 5/2016 | von Kraus | ............. | A61B 5/123 600/559 |

OTHER PUBLICATIONS

UHear2, "Unitron and CUNY Introduce Physician's Hearing Screening Toolkit", Hearingreview.com, Published on Feb. 4, 2015 (Year: 2015).*

UHear3, "Unitron Releases uHear Hearing Test App, Online Support Kit Published", Hearingreview.com, Feb. 10, 2015,. (Year: 2015).*

* cited by examiner

FIG. 6

SYSTEM AND METHOD FOR CONSUMER SCREENING, SELECTING, RECOMMENDING, AND/OR SELLING PERSONAL SOUND AMPLIFICATION PRODUCTS (PSAP)

CROSS-REFERENCE TO RELATED APPLICATIONS

Not Applicable

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to hearing assistance devices and, more specifically, relates to selecting hearing assistance devices in the form of Personal Sound Amplification Products.

BACKGROUND OF THE INVENTION

More than 36 million Americans are affected by a hearing impairment that is sufficiently profound as to prevent them from enjoying television, music, and other audio programs and/or from hearing in public meetings, church services, theater events, and the like. Hearing deficiencies can range from partial to complete hearing loss. Often, an individual's hearing ability varies across the range of audible sound frequencies, and many individuals have hearing impairment with respect to only some acoustic frequencies. For example, an individual's hearing loss may be greater at higher frequencies than at lower frequencies.

Hearing assistance devices such as hearing aids have been developed to compensate for hearing losses in individuals. Hearing aids are small electronic devices which can be hidden behind the ear, in the ear, partially in the ear canal, or completely in the ear canal. In general, such a device acquires sound that arrives at the user's ear, converts that sound to an electronic signal, amplifies the electronic signal, and sends the amplified electronic signal to a speaker in or adjacent the wearer's ear. In that way, the volume of the initial sound acquired by the hearing aid is increased, allowing the wearer's diminished hearing to hear the sound if the volume has been sufficiently increased. However, such hearing aids also amplify background noise and/or other undesired sounds that are necessarily present in the real world along with conversation or other sounds desired to be heard by the wearer. Additionally, such hearing aids can on occasion feedback, creating an unpleasant squeal. Furthermore, the electronic parts of such hearing aids can also be negatively affected by external devices or interference.

To overcome these problems, current hearing aids have adjustable operational parameters that can be configured by a hearing specialist to enhance the performance of the hearing aid. Many hearing aids provide a wide range of processing types and settings that may require extended interaction with the wearer and their environment to customize the device for the specific wearer. To customize a hearing aid, the hearing specialist will either spend a significant amount of time assisting the wearer with fine-tuning, or the wearer is given a portable device to fine-tune the hearing aid on their own. As a result, hearing aids and the process of obtaining and customizing the hearing aids are complex and expensive. According to the National Institute of Deafness and Other Communication Diseases, of the 36 million Americans who might benefit from a hearing aid, only about 20 percent actually obtain and use one. This is believed to largely due to the high price of hearing aids.

Personal Sound Amplification Products (PSAP) are also available to consumers. PSAP are defined by the U.S. Food and Drug Administration as wearable electronic products that are intended to amplify sound for people who are not hearing impaired. They are not hearing aids, which the FDA describes as intended to compensate for impaired hearing. PSAP are not intended to treat hearing impairment, they are intended to provide assistance to consumers who struggle with communication. Thus, for some individuals PSAP are useful alternatives to hearing aids. Because they do not require a medical prescription and professional fitting like required for hearing aids, PSAP have been described as the audio version of nonprescription reading glasses.

PSAP have grown in popularity among some people with hearing impairment, in part because PSAP are less expensive than custom hearing aids, although apathy, vanity and difficulty scheduling appointments with audiologists also have been cited as reasons for low hearing aid adoption. Because they do not require medical examination and fitting, PSAP range from as little as fifty to several hundred dollars in price, while custom hearing aids cost about fourteen hundred dollars on average and are not covered by Medicare and many insurance plans. As much as seventy percent of the final price of a hearing aid can be accounted for by additional services from audiologists that are bundled into the price.

Many PSAP are sold direct to the consumer through online stores, mail order catalogs, etc. PSAP are available from a variety of manufacturers having a wide range of products that vary in price and performance. Simple models typically just amplify sound while more sophisticated designs provide directional microphones and customizable equalization of the audio signal to clear up ambient or extraneous noise. The more advanced PSAP contain much of the same technology found in hearing aids. As a result, consumers must select from a wide array of available PSAP without the assistance of a medical professional or other forms of assistance.

Accordingly, there is a need in the art for improved systems and methods for consumer screening, selecting, recommending, and/or selling PSAP to consumers who struggle with communication.

SUMMARY OF THE INVENTION

Disclosed are systems and computer implemented methods for selecting and recommending Personal Sound Amplification Products (PSAP) to consumers who struggle with communication that overcome at least some of the disadvantages of prior systems and methods described above. Disclosed is a computer implemented method for selecting and recommending one of a plurality of different personal sound amplification products (PSAP) to a user, comprising the steps of, in combination, electronically presenting to the user a plurality of questions regarding hearing that each requires a subjective response, electronically receiving from the user subjective responses to the plurality of questions, automatically selecting a recommended one of the plurality of different PSAP for the user based at least in part on the subjective responses electronically received from the user, and electronically presenting to the user the recommended one of the plurality of different PSAP.

Also disclosed is a system for selecting and recommending one of a plurality of different personal sound amplification products (PSAP) to a user, comprising, in combination, a computing device having a processor and memory configured to carry out the steps of electronically presenting to the user a plurality of questions regarding hearing that each requires a subjective response, electronically receiving from the user subjective responses to the plurality of questions, automatically selecting a recommended one of the plurality of different PSAP for the user based at least in part on the subjective responses electronically received from the user, and electronically presenting to the user the recommended one of the plurality of different PSAP.

Also disclosed is a computer implemented method for selecting and recommending one of a plurality of personal sound amplification products (PSAP) to a consumer, comprising the steps of, in combination, electronically presenting to the user a plurality of questions regarding hearing that each requires a subjective response, electronically receiving from the user subjective responses to the plurality of questions, automatically selecting a recommended one of the plurality of different PSAP for the user based at least in part on the subjective responses electronically received from the user; and electronically presenting to the user the recommended one of the plurality of different PSAP. The plurality of questions includes at least one question relating to each of hearing difficulty during one-on-one conversations, hearing difficulty during conversations with women and/or children, hearing difficulty with conversations in restaurants and/or meetings, and presence of stress and/or agitating sounds. The recommended one of the plurality of different PSAP provides enhancement of high frequencies if the electronically received subjective responses indicate difficulty hearing women and/or children, provides reduction of low frequencies if the electronically received subjective responses indicate difficulty hearing in restaurants and/or meetings, and provides phase cancellation if the electronically received subjective responses indicate presence of stress and/or agitating sounds.

From the foregoing disclosure and the following more detailed description of various preferred embodiments it will be apparent to those skilled in the art that the present invention provides a significant advance in the technology and art of systems and methods for recommending and/or selecting PSAP. Particularly significant in this regard is the potential the invention affords for providing simple, accurate, and cost effective systems and methods for recommending and/or selecting PSAP. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein:

FIG. 6 is an exemplary recommended product screen display for the system of FIG. 1 for recommending to a user one of a family of different Personal Sound Amplification Products (PSAP) produced by a single PSAP manufacturer.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods for recommending PSAP to consumers who struggle with communication disclosed hereafter. The following detailed discussion of various alternative and preferred embodiments will illustrate the general principles of the invention. Other embodiments will be apparent to those skilled in the art given the benefit of this disclosure.

Figure 1:
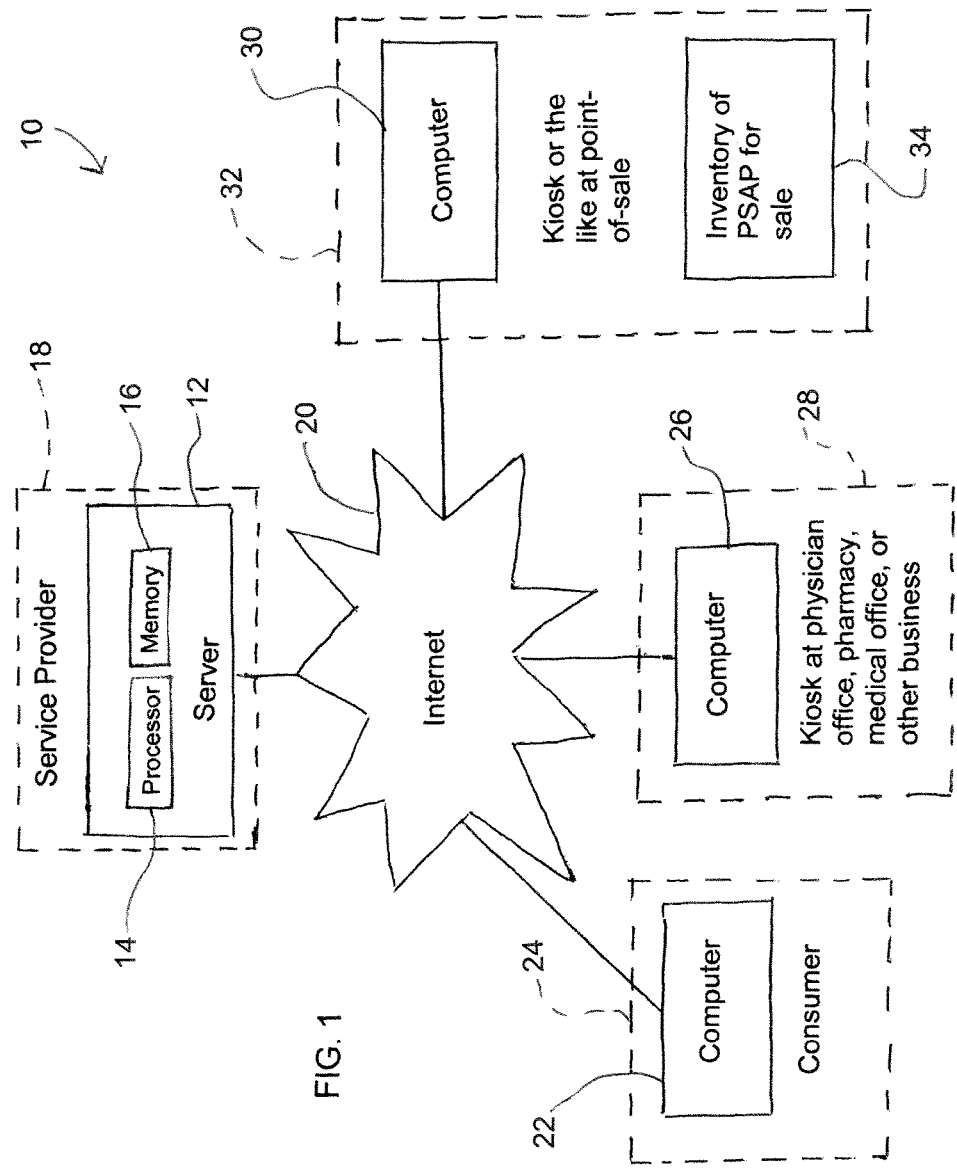
FIG. 1 is a block diagram of a system according to the present invention for recommending to a user one of family of different Personal Sound Amplification Products (PSAP) produced by a single PSAP manufacturer.

Referring now to the drawings, FIG. 1 shows a system 10 for selecting and recommending one of a family or plurality of different PSAP having differing communication or hearing corrections and produced by a single PSAP manufacturer that is best suited for a particular consumer who struggles with communication according to the present invention. The illustrated system 10 includes at least one server 12 including a processor 14 and memory 16 programmed with computer software for electronically carrying out instructions of a computer implemented method for selecting and recommending a suitable PSAP for a particular consumer according to the present invention. The illustrated server 12 is located at a service provider 18 and can be accessed by consumers via a communication network or system 20. It is noted that the server can be located elsewhere such as, for example, a cloud server. It is also noted that while the illustrated software is provided by the service provider 18 on its servers 12 as software as a service (SAS), the software can alternatively can be located at any other suitable location such as, for example, at the point-of-sale of a brick-and-mortal retail store. The illustrated communication system 20 is a computer network in the form of the Internet but any other suitable communication network or system can alternatively be utilized such as, for example, an intranet or any other network of computers, and the like.

In the illustrated system 10, the service provider server 12 provides a website that can be accessed by users or consumers via: (1) a personal computer 22 of a user or consumer 24; (2) a computer 26 in a specialized kiosk 28 located at any suitable location such as, for example, a physician office, a pharmacy, a medical office, treatment center or hospital, a shopping mall, an airport, and any other suitable business; and (3) a computer 30 in a kiosk 32 at a point-of-sale of having a physical inventory 34 of the plurality of the different PSAP such as, for example, a brick-and-mortar retail store and the like. While FIG. 1 shows a single consumer computer 22, a single specialized kiosk computer 26, and a single point-of sale computer 30, it should be appreciated that there will typically be a plurality of each type of computer 22, 26, 30. It should also be noted that not all of the illustrated computers 22, 26, 30 must be utilized and/or additional types of computers can alternatively or additionally utilized. The computers 22, 26, 30 can be any electronic device that can suitably communicate with the system 10 via the communication system 20 including, but not limited to, desktop computers, laptop computers, notebook computers, tablet computers, smart telephones, personal digital assistants (PDAs), digital cameras, mp3 players, video game systems, messaging systems, video players, smart televisions, and the like. When utilizing the illustrated consumer computer 22 or the illustrated specialized kiosk computer 26, the consumer accesses the website via the communication system 20 to select the most appropriate one of the plurality of different PSAP for the particular consumer, and any PSAP purchased by the consumer via the website is shipped to the consumer. When utilizing the illustrated point-of-sale computer 26, the consumer accesses the website via the communication system 20 to select the most appropriate one of the plurality of different PSAP for the consumer, and the consumer can purchase any PSAP physically located at the point-of-sale location. If desired, the point-of-sale computer 30 can additionally have ordering capability for instances where the selected PSAP is not currently in the inventory 34 at the point-of-sale location 32. In the case of the point-of-sale computer 30, it can be a stand-alone computer if desired (that is the software resides on the point-of-sale computer 30 rather than being accessed via the communication system 20) but this may limit purchasing capabilities because the consumer will be limited to only purchasing the PSAP in the inventory 34 at the point-of sale 32.

Figure 2:
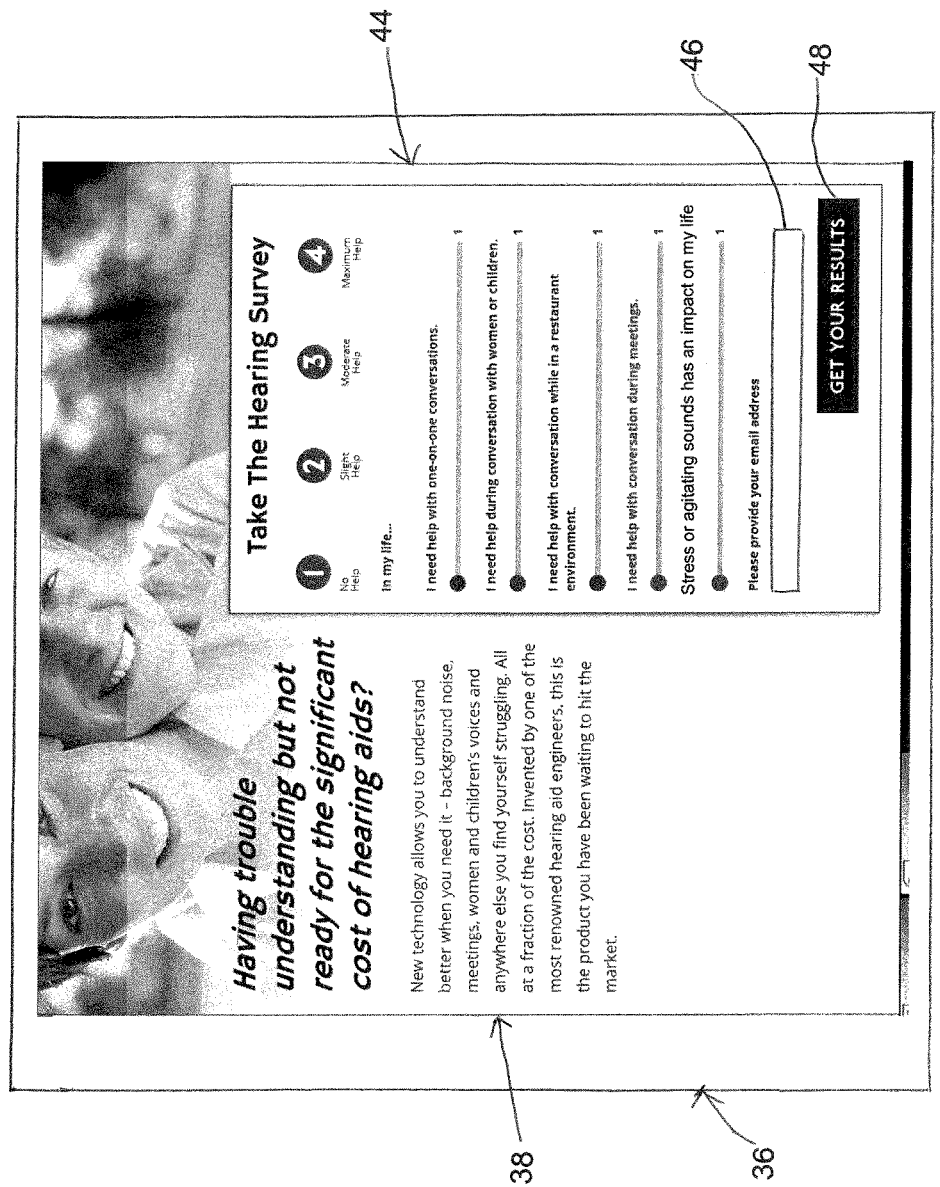
FIG. 2 is an exemplary home screen display of the system of FIG. 1 for recommending to a user one of a family of different Personal Sound Amplification Products (PSAP) produced by a single PSAP manufacturer.

FIG. 2 illustrates an exemplary screen display of a home or welcome page 36 of the website to be accessed by a user or consumer. The illustrated home page 36 includes general information 38 regarding selection of PSAP, a link 38 to the home or welcome page of the website (shown in FIG. 2), a link 40 to a cart page of the website (shown in FIG. 7), and a link 42 to a products page of the website (shown in FIGS. 3 and 4). The illustrated links 38, 40, 42 are also provided on each of the other pages of the illustrated website. It is noted that any other suitable links can alternatively and/or additionally be utilized. The illustrated welcome or home page 36 also includes a tool 44 for screening the consumer regarding their hearing, or difficulty of hearing, in communication situations. The illustrated screening tool 44 is a hearing survey that presents a plurality of questions regarding hearing difficulty, each of which requires a subjective response. The illustrated screening tool 44 also provides a plurality of subjective responses for each of the plurality of questions to be selected by the consumer (only one of which can be selected by the consumer for each of the plurality of questions). The illustrated welcome or home page 36 also includes an input box 46 for providing the email address of the consumer and a start button 48 ("Get Your Results" on the illustrated welcome or home page 36) which can be selected by the consumer to submit the consumer's subjective responses and email address to obtain a recommended one of the available plurality of different PSAP for the consumer based at least in part on the subjective responses of the consumer. It is noted that the welcome or home page can alternatively and/or additionally have any other suitable information, features, links, and/or tools.

The illustrated communication or hearing survey or screening tool 44 includes questions designed to determine whether the consumer has difficulty hearing or communicating with low volume sounds, high frequency sounds, and low frequency sounds, and whether the consumer has relaxation problems. It is noted, however, that any other suitable hearing or communication problems can additionally and/or alternatively be utilized depending on the capabilities of the particular family or plurality of different PSAP available to be selected and recommended to the consumer. These communication difficulties are determined by the illustrated communication or hearing survey by asking at least one question relating to hearing or communication difficulty during one-on-one conversations (relates to general volume hearing problem), hearing or communication difficulty during conversations with women and/or children (relates to a high frequency hearing problem), hearing or communication difficulty during conversations in restaurants and/or meetings (relates to a low frequency/white noise problem), and presence of stress and/or agitating sounds in ears (relates to a relaxation problem). The illustrated communication or hearing survey 44 has five questions that determine these potential needs of the consumer but any other suitable quantity of questions can alternatively be utilized. The quantity of questions is typically determined by the quantity of PSAP having a unique correction feature that is available in the group available for selection and recommendation. The illustrated questions are: "In my life I need help with one-one one conversations"; "In my life I need help during conversation with women and children"; "In my life I need help during conversation while in a restaurant environment"; "In my life I need help with conversation during meetings"; and "In my life stress or agitating sounds has an impact on my life". It is noted that the illustrated questions can alternatively be phrased in any other suitable manner.

The illustrated communication or hearing survey 44 also presents to the consumer a plurality of subjective responses designed to determine the extent of the consumer's communication difficulties relating to volume, high frequencies, low frequencies, and relaxation, but any other suitable problems can additionally and/or alternatively be utilized depending on the capabilities of the PSAP available to be selected and recommended to the consumer. The illustrated communication or hearing survey 44 has four subjective responses for selection by the consumer for each of the plurality of questions but any other suitable quantity of subjective responses can alternatively be utilized. For example, the questions could alternatively be formed so that only a subjective yes/no reply is required. The illustrated subjective responses are common among all the questions but alternatively the subjective responses can vary among the questions if desired. The illustrated subjective responses are: (1) "No Help"; (2) "Slight Help"; (3) "Moderate Help"; and (4) "Maximum Help". The illustrated communication or hearing survey 44 is provided with a slider or sliding scale for each question which limits selection to only one subjective response for each of the plurality of questions. It is noted that the subjective responses can alternatively be selected using any other suitable means such as, for example, radio buttons, check boxes, drop down menus, and the like.

Figure 3:
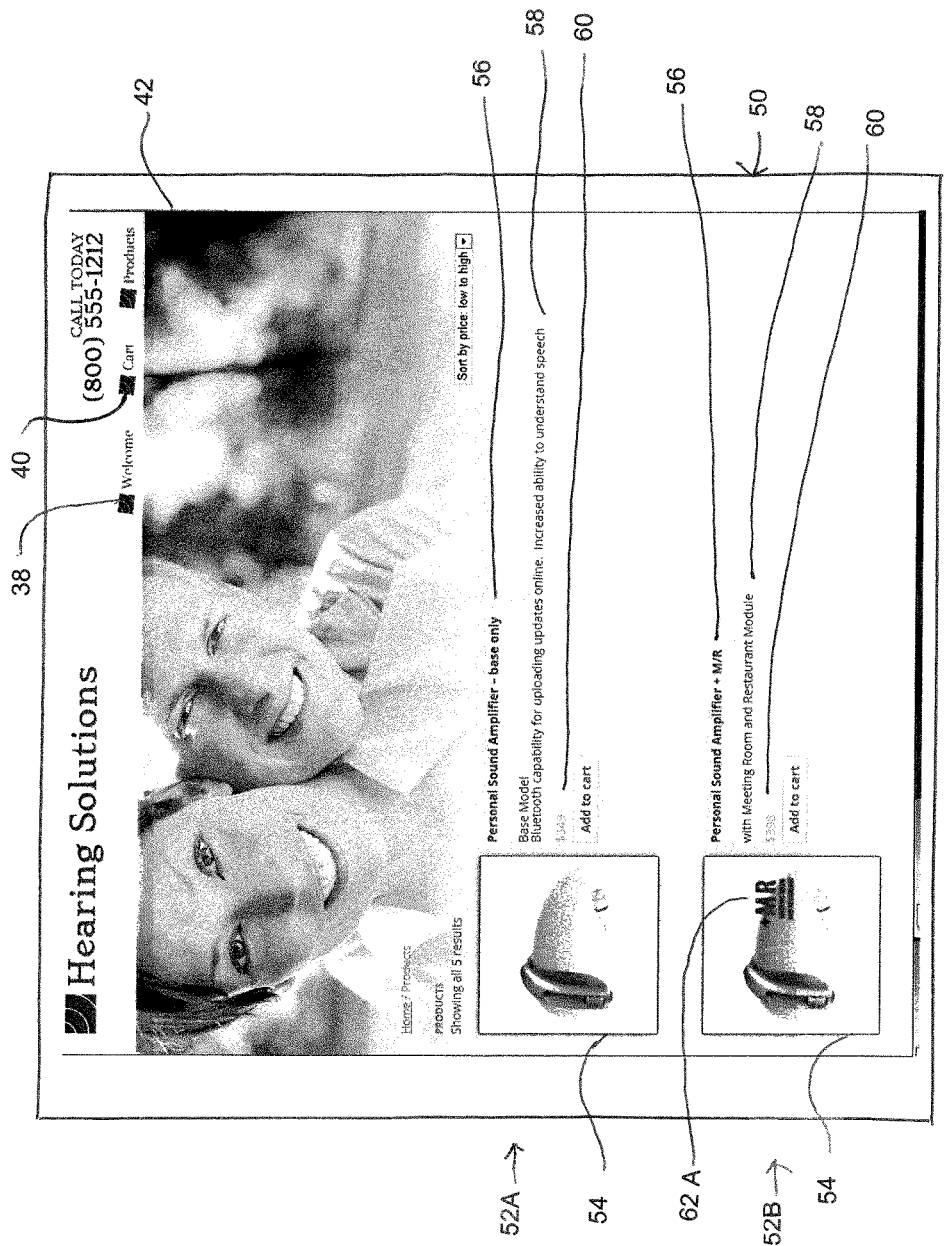
FIG. 3 is a first portion of an exemplary product screen display of the system of FIG. 1 for recommending to a user one of a family of different Personal Sound Amplification Products (PSAP) produced by a single PSAP manufacturer.
Figure 4:
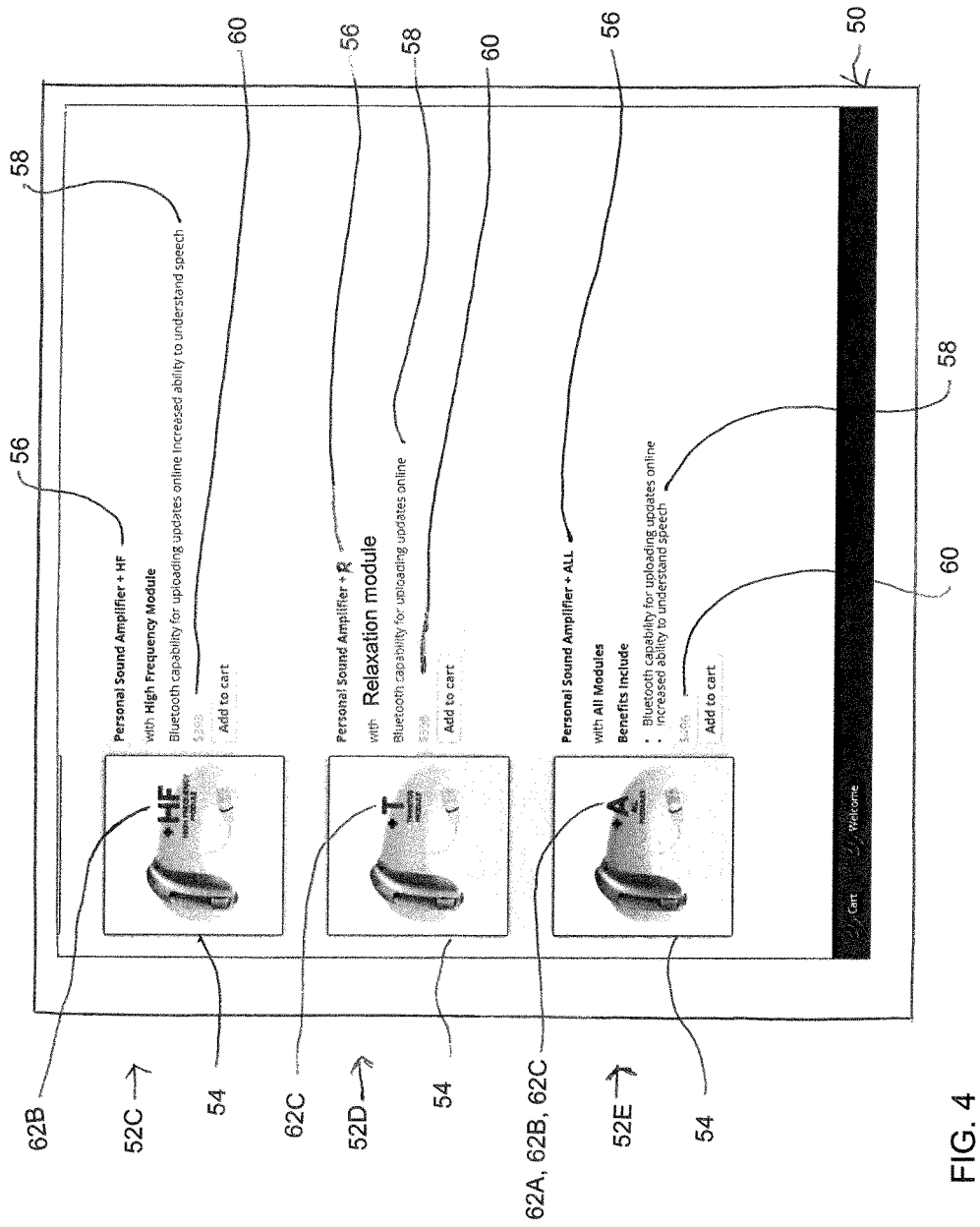
FIG. 4 is second portion of the exemplary product screen display of FIG. 3.

FIGS. 3 and 4 illustrate an exemplary screen display of a product page 50 of the website to be accessed by consumers. The exemplary product page 50 displays a plurality of different PSAP 52A, 52B, 52C, 52D, 52E having different communication or hearing corrective features. The illustrated product page 50 displays the following for each PSAP 52A, 52B, 52C, 52D, 52E: (1) a photo of the PSAP 52A, 52B, 52C, 52D, 52E, (2) a name 56 of the PSAP 52A, 52B, 52C, 52D, 52E, (3) a brief description 58 of hearing corrective features or capabilities of the PSAP 52A, 52B, 52C, 52D, 52E; and the (4) cost 60 of the PSAP 52A, 52B, 52C, 52D, 52E. The illustrated product page 50 displays five different PSAP 52A, 52B, 52C, 52D, 52E but any other suitable quantity of two or more PSAP 52A, 52B, 52C, 52D, 52E can alternatively be utilized. The Illustrated PSAP 52A, 52B, 52C, 52D, 52E are: (1) Personal Sound Amplifier Base Model 52A which provides increased ability to understand speech (by increased volume of all sounds through amplification); (2) Personal Sound Amplifier +M/R 52B which provides the increased volume of the base model 52A plus an M/R module 62A that provides increased ability to understand conversations in meeting rooms and/or restaurants (by reduction of low frequency noise); (3) Personal Sound Amplifier +HF 52C which provides the increased volume of the base model 52A plus and an HF module 62B that provides increased ability to understand high frequency sounds such as conversations with women and/or children (by increasing high frequencies through amplification); (4) Personal Sound Amplifier +R 52D which provides the increased volume of the base model 52A plus an R module that provides reduction of stress and/or agitating sounds in ears (by phase cancellation); and (5) Personal Sound Amplifier +ALL 52E which provides the increased volume of the base model 52A, the increased ability to understand conversations in meeting rooms and/or restaurants of the M/R module 62A, the increased ability to understand high frequency sounds such as conversations with women and/or children of the HF module 62B, and the reduction of stress and/or agitating sounds of the R module 62C. It is noted that additionally or alternatively there can be PSAP 52A, 52B, 52C, 52D, 52E with other combinations of the illustrated modules 62A, 62B, 62C such as, for example, +M/R and HF, +M/R and R, and/or +HF and R and/or there can be other modules available.

The PSAP 52A, 52B, 52C, 52D, 52E of the illustrated family or plurality of different PSAP 52A, 52B, 52C, 52D, 52E are designed so that one or more of the modules (M/R, HF, R) 62A, 62B, 62C, each providing a different communication or hearing correction not provided by the base model 52A, can be added to the first or base model 52A to form the second model 52B, the third model 52C, the fourth model 52D, the fifth model 52E etc. The modules 62A, 62B, 62C can be added as software, hardware or a combination of software and hardware. It is noted that the plurality of different PSAP 52A, 52B, 52C, 52D, 52E can alternatively be designed as standalone models without the ability to add modules or in any other suitable manner if desired. The illustrated embodiment has three modules (M/R, HF, R) 62A, 62B, 62C that are selectively added to the first or base model 52A to form second to fifth models 52B, 52C, 52D, 52E but any other suitable quantity of modules 62A, 62B, 62C can be used and any other quantity of different models 52A, 52B, 52C, 52D, 52E can be formed. It is noted that manufacturing costs can be reduced by providing the base model 52A from which all the other models are produced by adding one or more of the modules 62A, 62B, 62C to the base model 52A. The plurality of questions in the communication or hearing survey 44 is preferably structured to determine which if any of the modules (M/R, HF, R) 62A, 62B, 62C should be added to the base model 52A for a particular consumer. Preferably the modules (M/R, HF, R) are entirely software modules so that the first or base model 52A can be converted into any of the other models by 52B, 52C, 52D, 52E by downloading the appropriate software module or modules (M/R, HF, R) to a first or base model 52A. Additionally, the PSAP 52A, 52B, 52C, 52D, 52E are preferably provided with Bluetooth or any other suitable wireless technology so that software residing in memory of the PSAP 52A, 52B, 52C, 52D, 52E can be easily updated and additional and/or replacement modules (M/R, HF, R) can be easily downloaded to the memory of the PSAP 52A, 52B, 52C, 52D, 52E. It should be appreciated that such a configuration enables a point-of-sale location to stock only the base module 52A which can then be converted to any of the models 52B, 52C, 52D, 52E by downloading the appropriate module or modules (M/R, HF, R) to the base model 52A depending on the model purchased by the consumer. Such downloading of modules can be performed at the point-of-purchase or via the internet.

Figure 5:
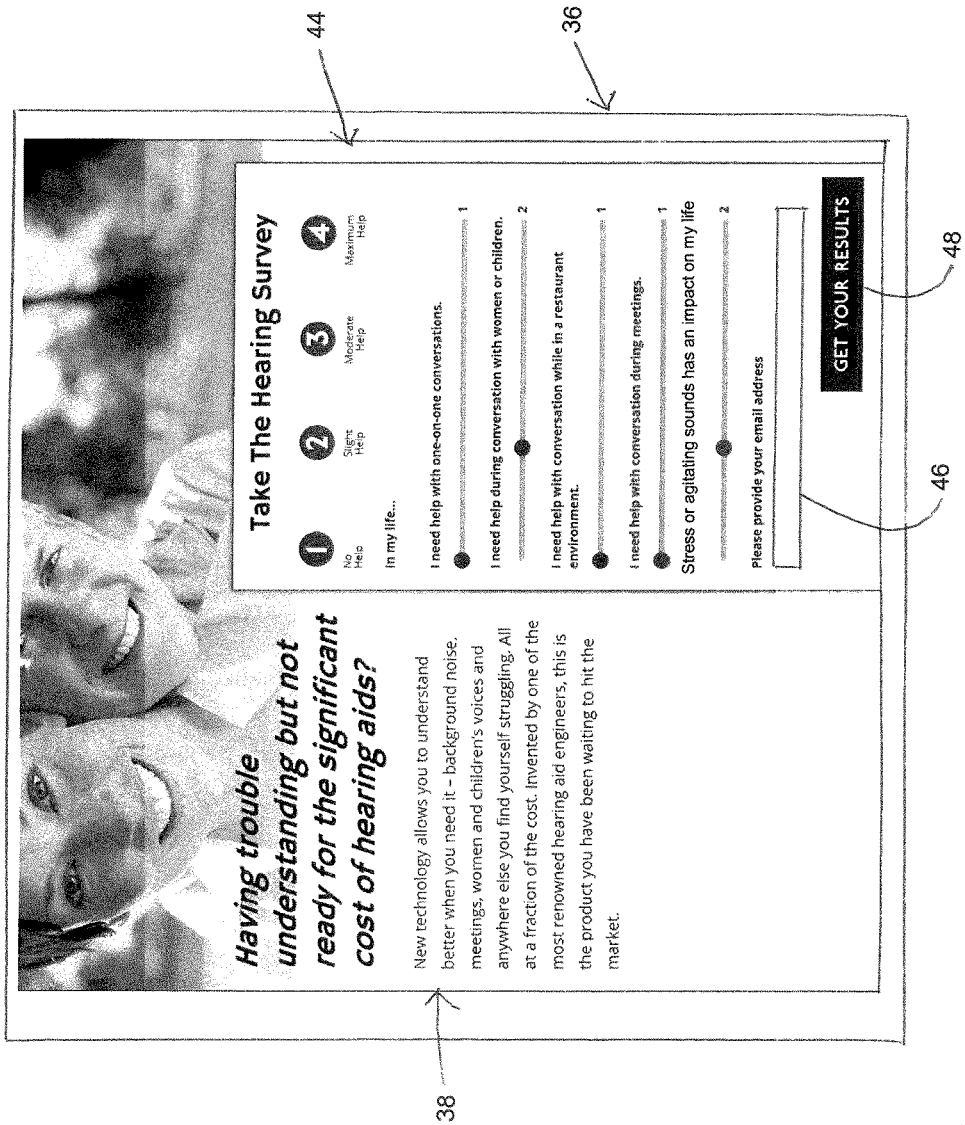
FIG. 5 an exemplary home screen display similar to FIG. 1, but wherein a user has provided subjective responses to a plurality of questions relating to the user's hearing.

As best shown in FIG. 5, the consumer provides subjective answers to the illustrated plurality of questions of the communication or hearing survey 44 by moving the slider scale to the appropriate subjective answer for each of the plurality of questions. In the illustrated communication or hearing survey 44, the consumer has answered (1) "No Help" for the first, third and fourth illustrated questions ("In my life I need help with one-one one conversations", "In my life I need help during conversation while in a restaurant environment", and "In my life I need help with conversation during meetings"), and answered (2) "Slight Help" for the second and fifth questions ("In my life I need help during conversation with women and children"; and "In my life of stress or agitating sounds has an impact on my life"). Once the consumer answers each of the plurality of questions and selects the start button 48 ("Get Your Results"), the software automatically determines or selects a recommended one of the plurality of different PSAP 52A, 52B, 52C, 52D, 52E specifically for the consumer based at least in part on the subjective responses electronically received from the consumer.

A desired selection from the plurality of different PSAP 52A, 52B, 52C, 52D, 52E is predetermined for each possible combination of subjective responses provided by the consumer and stored so that upon receiving the subjective responses, the software automatically selects the desired one of the plurality of different PSAP 52A, 52B, 52C, 52D, 52E for recommendation to the consumer. For the illustrated communication or hearing survey 44 and the quantity of different PSAP 52A, 52B, 52C, 52D, 52E, when the consumer indicates only that they need increased volume (difficulty communicating in one-on-one conversations, the Personal Sound Amplifier Base Model 52A is recommended. When the consumer indicates only that they need increased volume of high frequency sounds (difficulty during conversations with women or children), the Personal Sound Amplifier +HF 52C is recommended. When the consumer indicates only that they need decreased low frequency sounds (difficulty during conversations in one or both of restaurants and meetings), the Personal Sound Amplifier +M/R 52B is recommended. When the consumer indicates only that they have relaxation problems (of stress and/or agitating sounds), the Personal Sound Amplifier +R 52D is recommended. When the consumer indicates only that they need more than one type of assistance (difficulty during conversations in one or both of restaurants and meetings), the Personal Sound Amplifier +ALL 52E is recommended. It is noted that with other types of questions and/or other types of PSAP available, the recommendations may be different. For example, if the consumer needs increased volume of high frequency sounds and decreased low frequency sounds but does not have relaxation problems, the Personal Sound Amplifier +ALL 52E is recommended in the illustrated embodiment but a PSAP having increased volume of high frequency sounds, decreased low frequency sounds, and no relaxation problem correction if such a model of PSAP was available among the plurality of available different PSAP.

Figure 6:
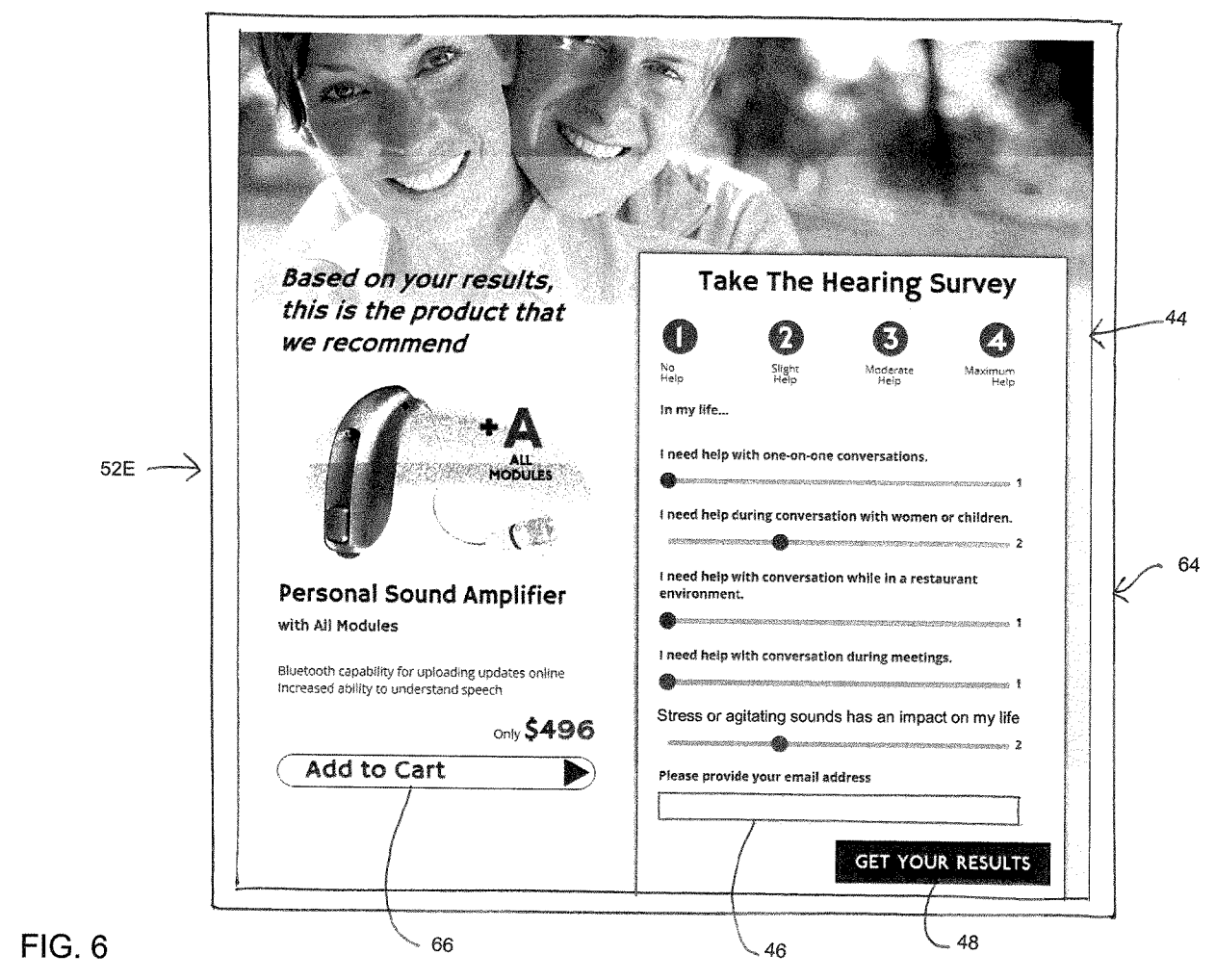

FIG. 6 illustrates an exemplary screen display of the results page 64 of the website that is automatically presented to the consumer after the consumer selects the start button 48 and a recommended one of the plurality of different PSAP 52E is automatically determined or selected by the software. The results page 64 electronically presents the recommended one of the plurality of different PSAP 52E to the consumer. In the illustrated embodiment, information regarding the recommended one of the plurality of available different PSAP 52A, 52B, 52C, 52D, 52E is presented adjacent to the communication or hearing survey 44 so that the consumer can make changes to their subjective responses if desired. The displayed information is similar to that on the product page 50 as described hereinabove. The illustrated results page 64 also includes an "Add to Cart" button 66 which can be selected to add the recommended PSAP 52E to the consumer's shopping cart and automatically takes the consumer their shopping cart page 68 (shown in FIG. 7).

Figure 7:
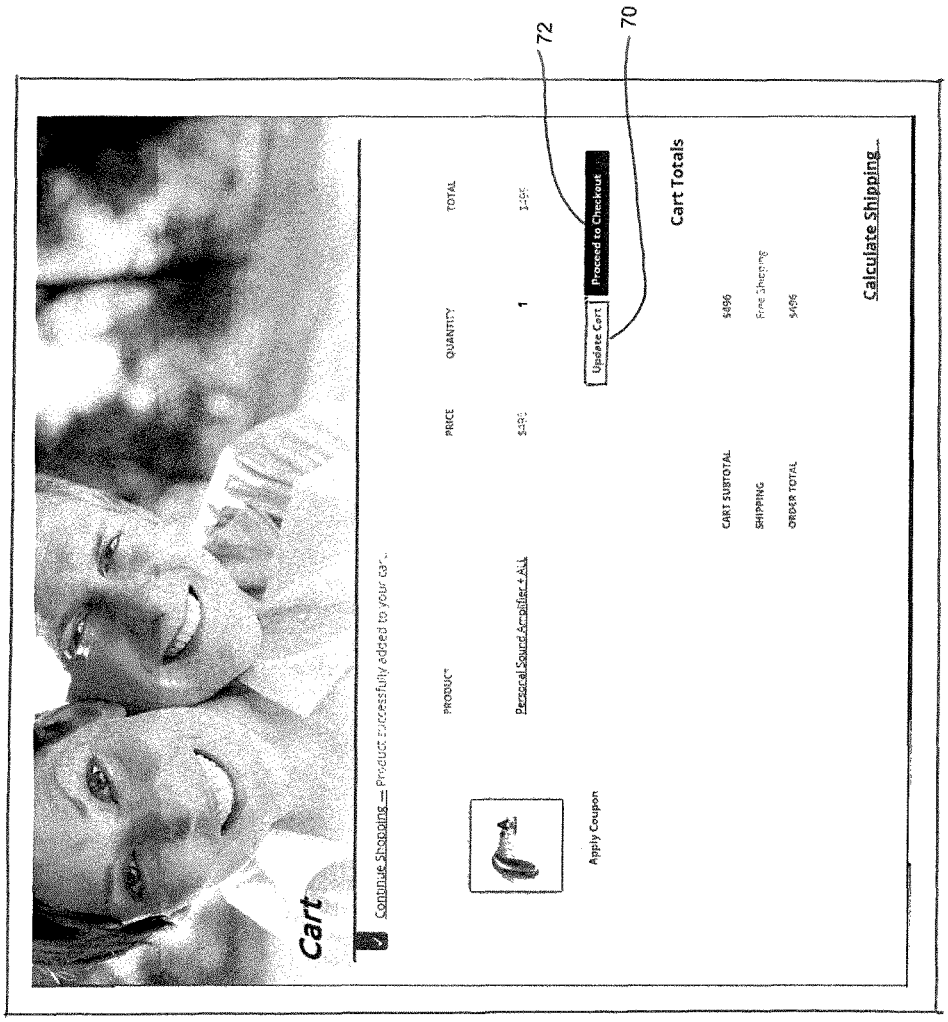
FIG. 7 is an exemplary shopping cart screen display for the system of FIG. 1 for recommending to a user one of a family of different Personal Sound Amplification Products (PSAP) produced by a single PSAP manufacturer.

FIG. 7 illustrates an exemplary screen display of the shopping cart page 68 of the website that is automatically presented to the consumer after the consumer selects the "Add to Cart" button 66 on the results page 64 (shown in FIG. 6). The illustrated cart page 68 displays each PSAP 52A, 52B, 52C, 52D, 52E that has been added to the shopping cart, the quantity of each PSAP 52A, 52B, 52C, 52D, 52E, the total price for each PSAP 52A, 52B, 52C, 52D, 52E, the shopping cart subtotal, the shipping costs, and the total costs. The illustrated shopping cart page 68 also includes buttons 70, 72 that, when selected, enable the consumer to update the shopping cart and proceed to checkout. When the consumer proceeds to checkout they can complete their purchase of the one or more PSAP 52A, 52B, 52C, 52D, 52E identified in the shopping cart. Once purchased, the purchased ones of the PSAP 52A, 52B, 52C, 52D, 52E are shipped to the consumer. Additionally or alternatively, the consumer can be electronically instructed to purchase the recommended PSAP 52A, 52B, 52C, 52D, 52E on site from inventory 34 if the computer 30 is located at a point-of-sale location 32.

When possible, such as, for example, when the computer 26, 30 is in a kiosk 28, 32, it is preferred that the consumer is provided with access to physical samples of the plurality of different PSAP 52A, 52B, 52C, 52D, 52E so that they consumer can inspect the plurality of different PSAP 52A, 52B, 52C, 52D, 52E without the consumer placing the physical samples in their ears and listening with them. Alternatively, the physical samples can be configured so that the consumer has the option to hear with the physical samples of each the plurality of different PSAP 52A, 52B, 52C, 52D, 52E and/or hear a suitable representation of what hearing would be like with each the plurality of different PSAP 52A, 52B, 52C, 52D, 52E.

Figure 8:
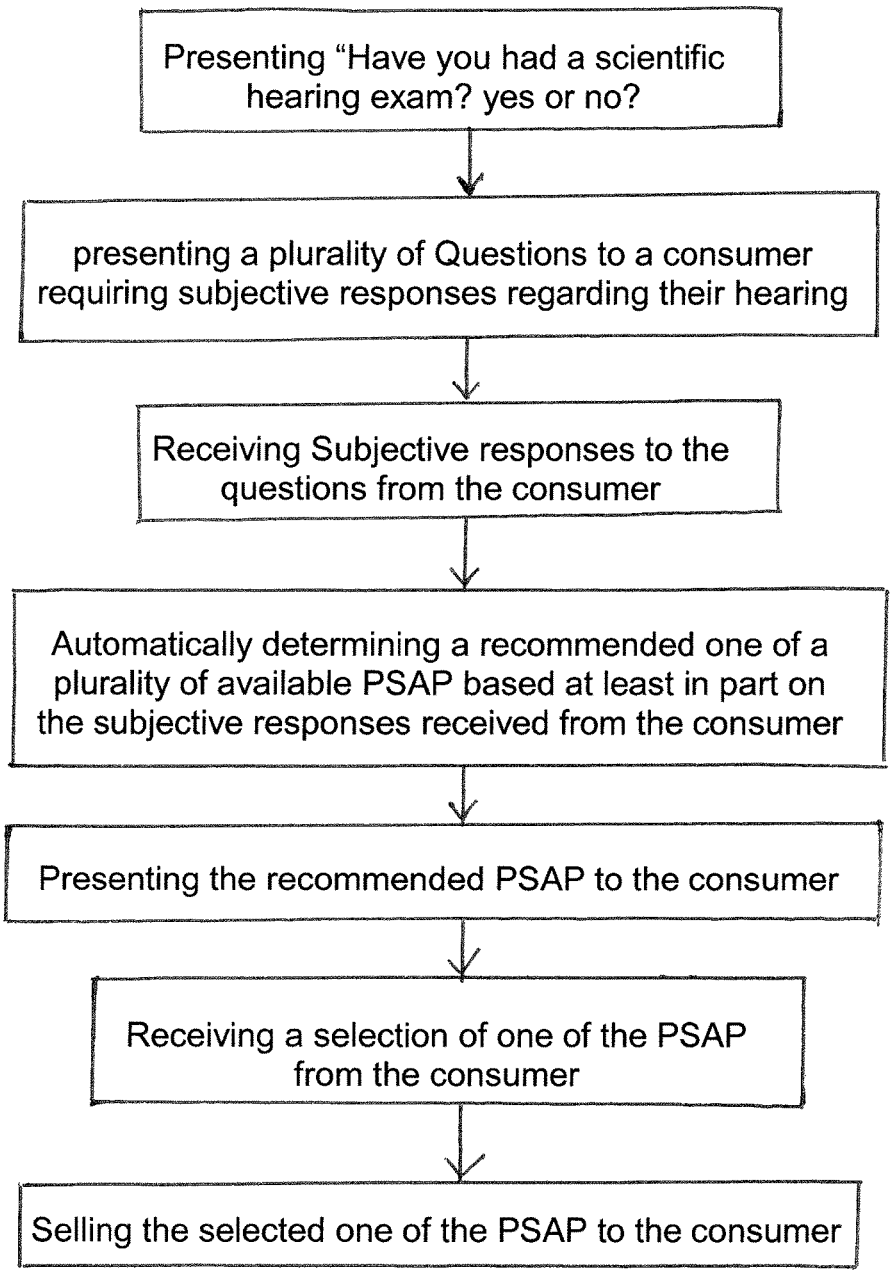
FIG. 8 is a block diagram of a method for recommending to a user one of a family of different Personal Sound Amplification Products (PSAP) produced by a single PSAP manufacturer.

The illustrated method is preferably initiated by the consumer obtaining a specific hearing exam performed by a suitable primary care physician (PCP), physician's assistant, medical technician, or other qualified medical personnel. As best shown in FIG. 8, after receiving a hearing exam, the illustrated method recommends a suitable PSAP to the consumer at any desired location such as, a physician's office, a pharmacy or drug store, other retail stores, a kiosk at other locations etc. As discussed above, this portion of the illustrated method can be selected the computer implemented. The illustrated method is preferably initiated by electronically presenting a question as to consumer via the computer 22, 26, 30 as to whether the consumer has obtained a specific hearing exam. If the consumer provides a negative response, the software can be configured to either (1) instruct the consumer to obtain a specific hearing exam before proceeding and not permitting the consumer to proceeding until an affirmative response is provided or (2) electronically presenting a warning to the consumer against proceeding without first obtaining a specific hearing exam but allowing them to proceed. If the consumer provides an affirmative response, the software can automatically proceed to the next step. It may be desirable to eliminate this first step, particularly when the computer 22, 26, 30 is located at a physician office and access is provided to the consumer only after a suitable medical exam has occurred. Next, the communication or hearing survey 44 is electronically presented to the consumer including a plurality of questions regarding hearing, or hearing difficulty, via the computer 22, 26, 30 that each requires a subjective response. Also electronically presented via the computer 22, 26, 30 to the consumer is a plurality of subjective responses for each of the plurality of questions, from which the consumer can select only one subjective response for each of the plurality of questions. The consumer selects one of the subjective answers for each of the plurality of questions of the communication or hearing survey 44 using the sliding scales on the welcome or home page 6. Once the plurality of questions has been answered, the consumer selects the start button 48 ("Get Your Results" on the illustrated computer screen). The server of the service provider electronically receives the subjective responses to the plurality of questions from the consumer and the software automatically determines or selects a recommended one of the plurality of different PSAP 52A, 52B, 52C, 52D, 52E based at least in part on the subjective responses received from the consumer. The service provider server then electronically presents the recommended one of the plurality of different PSAP 52A, 52B, 52C, 52D, 52E to the consumer via the results page 64. The consumer can then select the recommended PSAP 52A, 52B, 52C, 52D, 52E and/or any other of the plurality of different PSAP 52A, 52B, 52C, 52D, 52E by placing the selected PSAP in a shopping cart of the consumer. The service provider server electronically receives the selection of one or more of the plurality of different PSAP 52A, 52B, 52C, 52D, 52E and purchase and shipping procedures can be initiated. Additionally or alternatively, the consumer can be electronically instructed to purchase the recommended PSAP 52A, 52B, 52C, 52D, 52E on site if the computer 30 is located at a point-of-sale location 32.

Any of the features or attributes of the above described embodiments and variations can be used in any combination with any of the other features and attributes of the above described embodiments and variations as desired.

From the forgoing disclosure and detailed description, it is apparent that the systems and methods according to the present invention enable consumers to more effectively select a PSAP that will assist with their communication problems without the help of a hearing specialist, audiologists, or other medical professional. Additionally, the plurality of different PSAP can be produced from a base model and a plurality of different modules that can be added to the base model so that a wide range of features can be selected and cost effectively provided.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A computer implemented method for selecting and recommending one of a plurality of different personal sound amplification products (PSAP) to a user, comprising the steps of, in combination:
    electronically presenting to the user a plurality of questions regarding hearing that each requires a subjective response from the user;
    electronically receiving from the user subjective responses to the plurality of questions;
    automatically electronically selecting a recommended one of the plurality of different PSAP for the user based at least in part on the subjective responses electronically received from the user;
    wherein the plurality of different PSAP comprises a base model which includes a base module that increases the volume of all sounds, and additional models which each include the base module with the addition of at least one of a first correction module that reduces low frequency noise, a second correction module that increases the volume of high frequency noise, and a third correction module that provides phase cancellation;
    wherein the plurality of questions includes at least one question relating to each of hearing of low volume sound in order to determine if the base module is needed, hearing of low frequencies in order to determine if the first correction module is required, hearing of high frequencies in order to determine if the second correction module is needed by the user, and presence of relaxation problems in order to determine if the third correction module is needed by the user; and
    electronically presenting to the user the recommended one of the plurality of different PSAP.

2. The computer implemented method according to claim 1, wherein the plurality of questions includes at least one question relating to each of hearing difficulty during one-on-one conversations in order to determine if the base module is needed by the user, hearing difficulty during conversations in restaurants and/or meetings in order to determine if the first correction module is needed by the user, hearing difficulty during conversations with women and/or children in order to determine if the second correction module is needed by the user, and presence of stress and/or agitating sounds in order to determine if the third correction module is needed by the user.

3. The computer implemented method according to claim 1, wherein the recommended one of the plurality of different PSAP includes the second correction module to provide enhanced hearing of high frequencies if the electronically received subjective responses indicate difficulty hearing women and/or children.

4. The computer implemented method according to claim 1, wherein the recommended one of the plurality of different PSAP includes the first correction module to provide reduction of low frequencies if the electronically received subjective responses indicate difficulty hearing in restaurants and/or meetings.

5. The computer implemented method according to claim 1, wherein the recommended one of the plurality of different PSAP includes the third correction module to provide phase cancellation if the electronically received subjective responses indicate presence of stress and/or agitating sounds.

6. The computer implemented method according to claim 1, further comprising the step of electronically presenting a plurality of subjective responses for each of the plurality of questions for selection by the user, from which only one of the plurality subjective responses can be selected by the user for each of the plurality of questions.

7. The computer implemented method according to claim 1, further comprising the step of receiving from the user a selection of one of the plurality of different PSAP for purchase.

8. The computer implemented method according to claim 1, wherein the base model is configured so that one or more of the first correction module, the second correction module, and the third correction module can be added to the base model.

9. The computer implemented method according to claim 1, wherein the base model is configured so that one or more of the first correction module, the second correction module, and the third correction module can be added to the base model by downloading software to the base model.

10. A system for selecting and recommending one of a plurality of different personal sound amplification products (PSAP) to a user, comprising, in combination:
    a computing device having a processor and memory configured to carry out the steps of:
        electronically presenting to the user a plurality of questions regarding hearing that each requires a subjective response;
        electronically receiving from the user subjective responses to the plurality of questions;
        automatically electronically selecting a recommended one of the plurality of different PSAP for the user based at least in part on the subjected responses electronically received from the user;
        wherein the plurality of different PSAP comprises a base model which includes a base module that increases the volume of all sounds, and additional models which each include the base module with the addition of at least one of a first correction module that reduces low frequency noise, a second correction module that increases the volume of high frequency noise, and a third correction module that provides phase cancellation;

wherein the plurality of questions includes at least one question relating to each of hearing of low volume sound in order to determine if the base module is needed, hearing of low frequencies in order to determine if the first correction module is required, hearing of high frequencies in order to determine if the second correction module is needed by the user, and presence of relaxation problems in order to determine if the third correction module is needed by the user; and electronically presenting to the user a recommended one of the plurality of different PSAP.

11. The system according to claim 10, wherein the plurality of questions includes at least one question relating to each of hearing difficulty during one-on-one conversations in order to determine if the base module is needed by the user, hearing difficulty during conversations in restaurants and/or meetings in order to determine if the first correction module is needed by the user, hearing difficulty during conversations with women and/or children in order to determine if the second correction module is needed by the user, and presence of stress and/or agitating sounds in order to determine if the third correction module is needed by the user.

12. The system according to claim 10, wherein the recommended one of the plurality of different PSAP includes the second correction module to provide enhancement of high frequencies if the electronically received subjective responses indicate difficulty hearing women and/or children.

13. The system according to claim 10, wherein the recommended one of the plurality of different PSAP includes the first correction module to provide reduction of low frequencies if the electronically received subjective responses indicate difficulty hearing in restaurants and/or meetings.

14. The system according to claim 10, wherein the recommended one of the plurality of different PSAP includes the third correction module to provide phase cancellation if the electronically received subjective responses indicate presence of stress and/or agitating sounds.

15. The system according to claim 10, wherein the processor and memory are further configured to carry out the step of electronically presenting to the user a plurality of subjective responses for each of the plurality of questions, from which only one of the plurality of subjective responses can be selected by the user for each of the plurality of questions.

16. The system according to claim 10, wherein the processor and memory are further configured to carry out the step of receiving a selection of one of the plurality of different PSAP for purchase.

17. The system according to claim 10, wherein the base model is configured so that one or more of the first correction module, the second correction module, and the third correction module can be added to the base model.

18. The system according to claim 10, wherein the base model is configured so that one or more of the first correction module, the second correction module, and the third correction module can be added to the base model by downloading software to the base model.

19. A computer implemented method for selecting and recommending one of a plurality of different personal sound amplification products (PSAP) to a user, comprising the steps of, in combination:

electronically presenting to the user a plurality of questions regarding hearing that each requires a subjective response;

wherein the plurality of questions includes at least one question relating to each of hearing difficulty during one-on-one conversations, hearing difficulty during conversations with women and/or children, hearing difficulty during conversations in restaurants and/or meetings, and presence of stress and/or agitating sounds;

electronically receiving from the user subjective responses to the plurality of questions;

automatically electronically selecting a recommended one of the plurality of different PSAP for the user based at least in part on the subjective responses electronically received from the user;

wherein the plurality of different PSAP comprises a base model which includes a base module that increases the volume of all sounds, and additional models which each include the base module with the addition of at least one of a first correction module that reduces low frequency noise, a second correction module that increases the volume of high frequency noise, and a third correction module that provides phase cancellation;

wherein the base model is configured so that one or more of the first correction module, the second correction module, and the third correction module can be added to the base model;

wherein the recommended one of the plurality of different PSAP includes the second correction module to provide enhancement of high frequencies if the electronically received subjective responses indicate difficulty hearing women and/or children;

wherein the recommended one of the plurality of different PSAP includes the first correction module to provide reduction of low frequencies if the electronically received subjective responses indicate difficulty hearing in restaurants and/or meetings;

wherein the recommended one of the plurality of different PSAP includes the third correction module to provide phase cancellation if the electronically received subjective responses indicate presence of stress and/or agitating sounds; and electronically presenting to the user the recommended one of the plurality of different PSAP.

20. The computer implemented method according to claim 19, wherein the base model is configured so that one or more of the first correction module, the second correction module, and the third correction module can be added to the base model by downloading software to the base model.

* * * * *